Aug. 21, 1962  A. J. JANIK  3,050,103
FLARING TOOL

Filed July 9, 1959  2 Sheets-Sheet 1

INVENTOR.
ANTON J. JANIK
BY
J. D. Douglas
HIS ATTORNEY

Aug. 21, 1962   A. J. JANIK   3,050,103
FLARING TOOL
Filed July 9, 1959   2 Sheets-Sheet 2
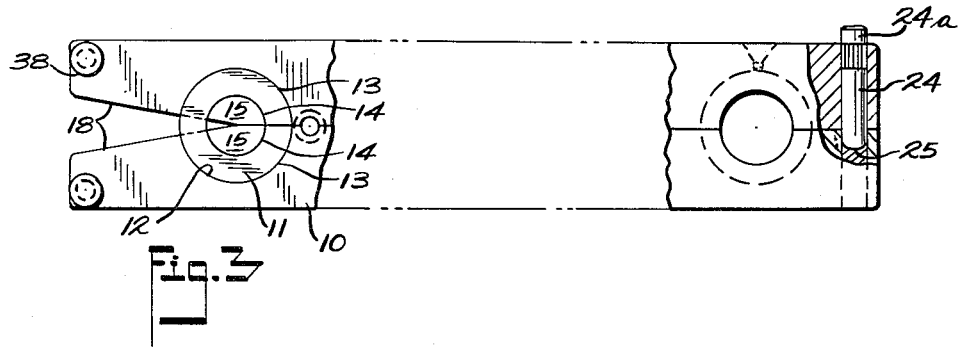
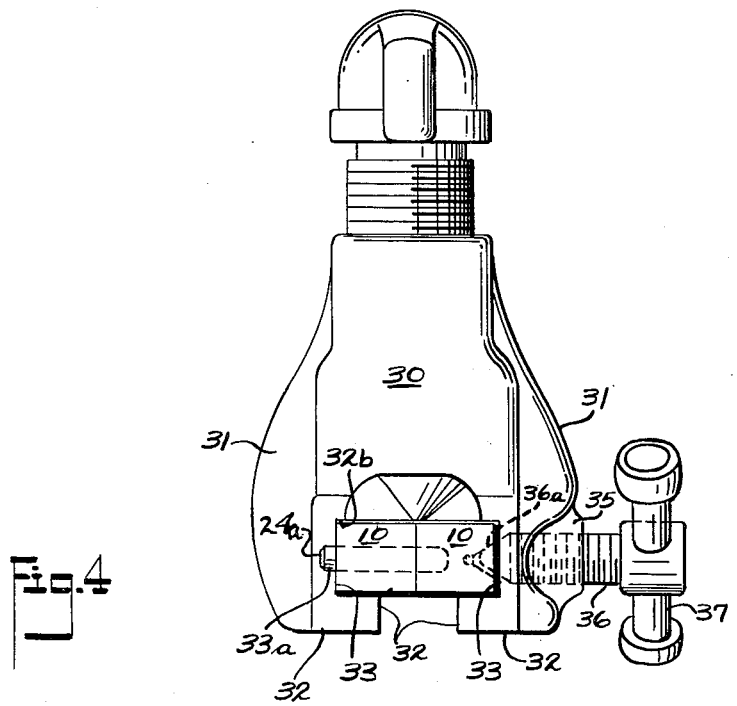
INVENTOR.
ANTON J. JANIK
BY
*J. N. Douglas*
HIS ATTORNEY though the tubing, such as copper tubing, to provide the proper con-
United States Patent Office 3,050,103
Patented Aug. 21, 1962

3,050,103
FLARING TOOL
Anton J. Janik, Elyria, Ohio, assignor to The Ridge Tool Company, Elyria, Ohio, a corporation of Ohio
Filed July 9, 1959, Ser. No. 826,047
8 Claims. (Cl. 153—81)

This invention relates to tools for flaring the ends of tubing, such as copper tubing, to provide the proper conformation for engagement with certain types of well known connectors or couplings.

Although tube flaring tools are well known to those versed in the art, there have been certain disadvantages inherent in the structure thereof which the present invention overcomes.

One of the principal difficulties of the prior devices was due to the fact that they were made in several separate parts, any one of these parts could and frequently did become lost, rendering the tool useless. In some instances, the assembly took considerable time, was difficult to achieve, and often resulted in an improper assembly with the result that inferior tube flaring was effected.

Another disadvantage resided in the fact that the prior devices were incapable of flaring the smaller sizes of tubes.

Still another disadvantage resided in the fact that the deformation of the metal was largely under the judgment and control of the operator, with the result that the flange was often overworked resulting in a hardening of the metal and providing a weakened joint when assembled with the coupling, which resulted in premature breakage.

By the present invention a highly simplified device is provided, wherein the parts always remain assembled and there are no separate parts to become lost. The placing of the tubing in the device becomes a very simple operation. Still another advantage resides in the fact that the working of the metal is not under complete control of the operator and therefore the metal cannot be as easily overworked and become hard as in the prior device.

Still another advantage of the invention resides in the fact that because of the construction efficient anti-friction means can be used in the working parts, thus making the flaring operation faster and much easier.

Still other objects of the invention and the invention itself will become more apparent from the following description of an embodiment thereof, which is illustrated by the accompanying drawings and forms a part of the specification.

In the drawings:

FIG. 3 is a broken plan view of the tube clamp bars prior to installation of the flaring mechanism; certain parts being shown in section; and FIG. 4 is an end elevational view of the complete flaring tool.

Briefly, the invention contemplates a pair of clamp bars, which are hingedly connected to each other spaced from their ends and having a plurality of tube clamping recesses thereon. A tube flaring mechanism is slidably disposed on the clamp bars and is provided with means for holding the bars clamping the tube during the flaring operation. It is also so constructed that the pressure is applied to the tube being flared through a spring and upon reaching a predetermined pressure the pressure increasing means is automatically disengaged so that the pressure cannot be exceeded.

Figure 1:
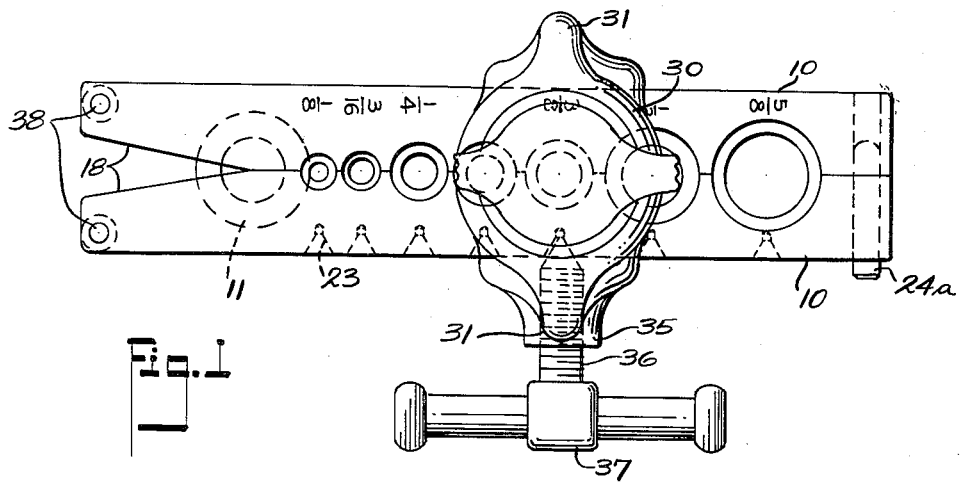
FIG. 1 is a plan view of the flaring tool of my invention.
Figure 2:
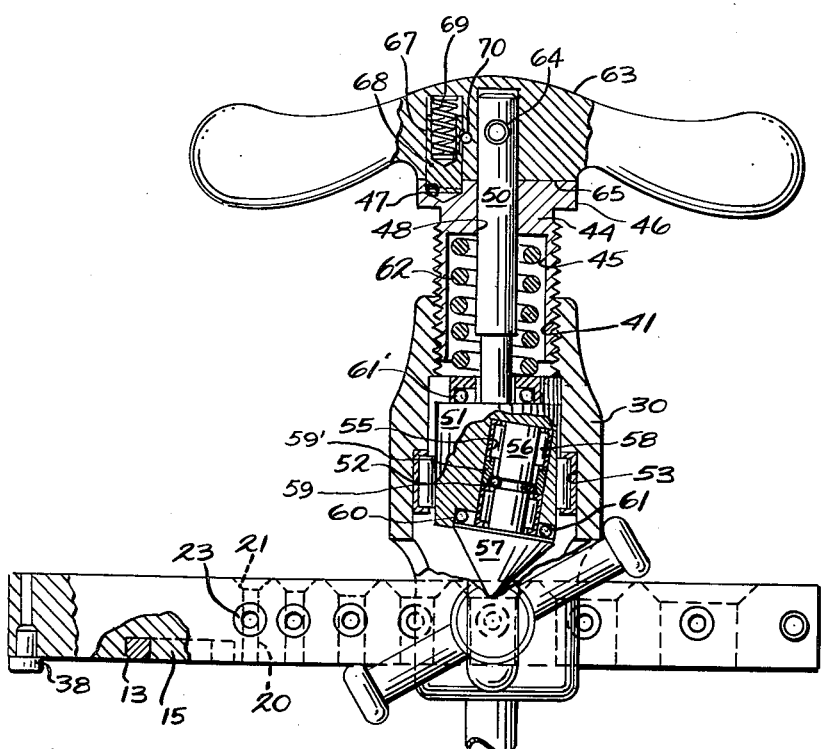
FIG. 2 is a view partly in section and partly in elevation of the device.

Referring now to the drawings, throughout which like parts have been designated by like reference characters, as best shown in FIG. 3, the tube clamping portion of the device includes a pair of elongated bars 10 of rectangular cross section. The bars are hingedly connected together spaced from their ends by a ring 11 which is disposed in semi-circular or ring-like channels 12 in each of the bars. The ring 11 may be held in the channels by any suitable means. In this instance the outer periphery of the channels is staked as indicated in FIG. 2 at 13 and the periphery of the center bosses 15 which defines the inner periphery of the channel is staked in a like manner. The ring is relieved on its inner and outer peripheries to permit the metal, due to the staking, to overhang the ring and still permit the sections to pivot freely.

Starting from the center of the ring and extending to the ends of the bosses, the two bars are cut away at an angle to provide diverging surfaces, as indicated at 18. This provides a clearance space so that the two bars may be swung about the pivot in opposite directions until the surfaces 18 meet, at which time the opposite ends will be spread apart to an equal angular displacement.

The inner edges of each of the bars are provided with tube clamping recesses, as best shown in dotted lines in FIG. 2, each of which comprises a lower portion 20 which is semi-cylindrical in form and an upper beveled portion 21. When the two bars are held together juxtaposed to each other, the lower parts 20 of the recess securely clamp the tube and the upper part 21 provides a clearance space into which the metal of the tube may be displaced to form the flare on the end of the tube. In the embodiment shown there are seven of the recesses 20—21 each designed to receive a different size of tube and each plainly marked from ⅛ to ⅝ inch, which are the sizes of tubes commonly flared with this type of tool. The number of recesses could vary, as is apparent to those versed in the art.

On the side of the bar nearest the observer, and opposite to each of the recesses, there are provided detents 23 which serve as a locater means for the flaring and clamping mechanism.

At the end of the bars one of the bars carries a locater pin 24 which is secured in the bar and which has a part extending into a bore 25 in the other bar for the purpose of maintaining the bars in proper alignment with each other when they are closed about a tube. The pin also extends outwardly, at 24a, to provide a stop for the flaring mechanism to prevent it from being slid off the ends of the bars.

The flaring and guide bar clamping mechanism includes a body 30, the opposite sides of which extend downwardly from the body and are provided with a pair of spaced apart clamp bar engaging members 32. Strengthening ribs 31 are provided on the sides. The clamp bar engaging members are spaced apart and provided with oppositely facing clamp bar engaging channels 33. The lower ends 32a of members 32 project toward each other and extend well under the clamp bars to provide ample support therefor. The upper channel sides 32b are considerably shorter, to assure non-interference with the flaring mandrel. The left side channel 33, as viewed in FIG. 4, is provided with a narrow channel 33a for the reception of the guide or locator pin 24a. This channel 33a does not extend entirely through, however, and therefore cooperates with the stop 24a which engages with the end of the channel to prevent removal of the flaring mechanism from the guides. The guide channels 33 are slightly wider in all directions than the clamp bars so that the bars may be slid freely therein.

The righthand leg 32, as viewed in FIG. 4, is provided with an internally threaded boss 35 in which a clamp screw 36 is threadedly disposed opposite to the channel. The clamp screw may be secured inwardly and has a pointed end 36a which is adapted to seat in any one of the recesses 23 of the clamp bars. A handle 37 is provided on its outer end for turning the screw.

Headed pins 38 are provided on the left ends of the clamp bars and serve as stops for the body when it is moved to the left preventing removal of the body from the bars. As can best be seen from FIGS. 2 and 4, the guide parts 32 are sufficiently short that when the flaring body 30 may be moved to the left until it engages the stops 38, the parts 32 are opposite the diverging sides 18 of the clamp bar and beyond the pivot point so that the bars may be swung apart adequately to permit easy insertion of the end of a tube into one of the recesses 20—21, without removing the flaring body.

Above the clamping portions, the upper part of the body is provided with an internally threaded upper bore 41. A feed screw is provided and includes an externally threaded member 44 having a bore 45 extending from its bottom end up to and spaced from the top. The top of the member terminates in a head 46 the upper surface of which is flat and is provided with one or more downwardly extending recesses 47.

The feed screw is threaded into the upper end of the body and the upper end of the screw is provided with a mandrel guiding channel 48 through which a mandrel operating stem 50 extends.

The stem 50 extends downward through the body and supports a cylindrical mandrel body 51 which is rotatably and slidably journalled in a needle bearing 52. The needle bearing 52 is seated in a counterbore 53.

The mandrel body 51 carries the forming mandrel per se. To this end, the body is provided with an inclined bore 55 in which the stem 56 of the forming mandrel is supported in needle bearings 58. The forming mandrel head 57 is conical and a thrust bearing 60 is provided between the base of the head and a shoulder 61 formed at the entrance to the bore 55.

It should be noted that the position and inclination of the forming mandrel 56—57, in the body 51, is such that the point of the mandrel head 57 is coincident with a center line extending along the axis of rotation of the body 51 and that the formation of the conical head is such that the surface of contact with the tube is coincident with that of the bevel 21 in the tube clamping recess. A spring ring 59 is seated in grooves in the mandrel stem 56 and the bearing spacer 59', to hold the mandrel in position.

Between the upper end of the bore 45 in the feed member, surrounding the stem and in engagement with a thrust bearing 61' resting on the upper end of the mandrel body 51 is a helical spring 62. The spring exerts pressure between end of the bore 45 in the feed member and the mandrel body, forcing the body downward along with the stem 50. The downward movement of the mandrel and its associated parts is resisted by a handle 63 which is pinned to the stem 50 at 64 and has a screw member engaging surface 65 which rests on the top of the screw member 44.

The handle body is provided with a blind hole 67 which receives a spring pressed plunger 68, the plunger in turn being provided with a blind hole in which a spring 69 is seated, the upper end being in engagement with the bottom of the blind hole 67. A retainer pin 70 extends through the handle and extends into a flat on the plunger to hold the plunger in the hole 67 and permits limited downward movement thereof. The plunger is adapted to be engaged in the recess 47 of the feed member 44.

Preferably the end of the plunger is formed with one side higher than the other. The low side is on the driving side, as shown by the dotted line. This, as will be appreciated, allows it to slip out of the hole 47 and permits it to pick up the feed screw on reverse turning.

In operation, the body 30 is assembled with the clamp bars by sliding it onto the clamp bars from the end opposite to the stop 38 and the locater pin 24a inserted in position. The body is moved to the left until it is beyond the pivot center, opposite to the diverging walls 18. The clamp bars may now be spread apart and a tube is placed in one of the recesses 20—21 with the end of the tube flush with the flared top 21 of the recess. The bars are brought together and the body 30 slid to the right until the point 36a of the clamp screw is opposite the appropriate recess 23, that being the recess opposite to the clamp recess 20—21 where the tube is to be clamped.

The screw 36 is then tightened by the handle 37 which clamps the bars securely together about the tube.

The handle 63 is then rotated, this rotates the mandrel assembly and also, by the plunger 68, the feed member 44. The feed member 44 moves downwardly, being in threaded engagement with the body 30. Pressure is exerted by the feed member 44 which is transmitted to the mandrel body 51 by the spring 62. The mandrel parts all move down until the face of the forming mandrel 57 engages with the inner upper edge of the tube. The movement being continued, the face of the forming mandrel rolls on the inner edge of the tube gradually swaging the same outward.

At some point during the process, the resistance to bending or swaging by the tube is greater than the pressure of the spring 62 and the spring 62 compresses. The feed screw, however, continues downward and gradually moves away from its engagement with the handle until a point is reached wherein the leading edge of the plunger 68 is no longer in engagement with the feed screw and the plunger is cammed upward. Further rotation of the handle only serves to rotate the mandrel and the feed screw stands still.

The spring pressure of the mandrel is still on the tube and continued revolution rolls the surface flat and smooth to its desired contour.

Usually the flaring operation is considered to be complete when the handle and feed screw are disengaged. A few extra revolutions of the handle assures the provision of a more smooth surface on the flared flange of the tube. When the flaring is finished the feed handle is turned in the other direction and the high side of the plunger 68 engages with the edge of the recess 47 and the feed member is rotated retracting the mandrel. The clamp screw 36 may then be loosened and the body moved to the left, the bars moved apart and the flared tube removed.

It frequently happens that the pressure exerted by the bars, in clamping the tube to be flared, is such that the tube seats so firmly in the clamping recesses and that the bars cannot be opened up to remove the tube. When the body is moved to the left after the flaring operation, until it engages the pins 38, the screw 36 may be tightened, thus exerting pressure on the ends of the bars opposite the diverging surfaces 18, forcing these surfaces together and causing the bars to open. This can be effected because the hinge means being inward from the ends, does not interfere with that operation.

It will be seen that anti-friction bearings are provided at all the critical points where friction occurs and therefore an easy working device is provided.

The body is left on the clamp bars at all times and it is unnecessary to remove the body. Therefore there is little chance of the parts becoming lost.

The improved type of hinge construction enables the tube to be inserted and removed without removing the body from the clamp bars. This simplifies the operation and makes it considerably quicker.

Once the tube is in the proper recess, only one screw 36 needs to be tightened and this serves to not only clamp the tube securely but to position the flaring mechanism at exactly the right position for the flaring operation.

Having thus described the invention in an embodiment thereof it is appreciated that numerous and extensive departures may be made therefrom without departing from

What is claimed is:

1. A tube flaring tool comprising a pair of clamp bars hingedly connected to each other having tube clamping recesses therein, a flaring tool body slidably mounted on said clamp bars, tube flaring means carried by said body and including a feed screw threadedly engaged with the body at one end thereof, a flaring mandrel shaft slidably supported by said feed means and having a flaring mandrel carried on said end opposite the clamp bars, spring means in engagement with the mandrel and the feed screw and comprising the sole means for transmitting pressure from the feed screw to the mandrel during a flaring operation, a feed screw turning means on the shaft outside said feed screw and spring pressed means carried by the turning means and disposed for interlocking turning engagement with the feed screw.

2. A tube flaring tool comprising means for clamping a tube to be flared, flaring means arranged to be connected to said tube clamping means and comprising a housing having a threaded bore therein, a feed screw threaded in said bore, a spring engaged by the feed screw, a mandrel having a shift extending slidably through the feed screw at one end and having a flaring mandrel carried by the other end opposite said tube clamp means, said spring being engaged with the mandrel to spring-press the mandrel toward the clamp means and comprising the sole means for transmitting pressure from the feed screw to the mandrel during a flaring operation, means for advancing the feed screw into the housing comprising a shaft rotating means secured to the end of the mandrel shaft, a spring pressed plunger carried by said shaft rotating means, and plunger engaging means formed on said feed screw for interlocking driving engagement with said plunger.

3. A device as described in claim 2, wherein the plunger has its end formed with a high side in the direction of rotation of the feed screw when it is screwed downward in said bore.

4. A device as described in claim 2, wherein said feed screw has a counterbore and said spring is disposed in the counterbore.

5. A device as described in claim 4, wherein the mandrel is provided with a flaring head and said spring engages the head with thrust bearing means disposed between the head and spring.

6. A tube flaring tool including tube clamping means, a flaring mechanism including a main body, said body being formed with a pair of clamp engaging legs slidably mounted on said clamp, screw means extending through one of said legs for engagement with the clamp, said body being formed with a threaded upper portion, a screw feed member disposed on the upper portion, a flaring mandrel including a stem rotatably and slidably mounted in the screw feed member, a mandrel body carried by said stem, a needle bearing for said mandrel body and supported in a counterbore in said main body, a mandrel head having a stem rotatably mounted in needle bearings in said body and having a cone shaped mandrel on its end, thrust bearing means between said head and the mandrel body, spring means interposed between said screw means and said body and thrust bearing means between the end of the spring and said mandrel body.

7. A tube flaring tool comprising a pair of clamp bars formed with tube clamping recesses therein disposed in longitudinally spaced relation along the inner faces of the bars, hinge means for hingedly connecting the bars together spaced from the ends of the bars and including a pivot ring, said clamp bars each being formed with semicircular channels and said ring slidably seated in said channels, and retainer means for holding the ring in said channels, said bars having outwardly diverging surfaces extending from the center of the pivot ring to the ends of the bars, a flaring tool body slidably mounted on said clamp bars and having clamp means for clamping said bars together, a tube flaring means carried by said body and including a feed screw threadedly engaged with the body at one end thereof, a flaring mandrel shaft slidably supported by said feed means and having a flaring mandrel carried on said end opposite the clamp bars, spring means in engagement with the mandrel and the feed screw and comprising the sole means for transmitting pressure from the feed screw to the mandrel during a flaring operation, a feed screw turning means on the shaft outside said feed screw and spring pressed means carried by the turning means and disposed for interlocking turning engagement with the feed screw, said flaring body being movable from flaring position to a position opposite said diverging surfaces and capable of exerting clamping pressure thereon to move said bars apart.

8. A tube flaring tool comprising a pair of clamp bars formed with tube clamping recesses therein disposed in longitudinally spaced relation along the inner faces of the bars, hinge means for connecting the bars together spaced from the ends thereof, and with the center of pivotal point at the meeting line between the bars, said bars being formed with obtuse surfaces extending from the center of the pivotal point outward toward the ends and sides of the bars to leave the space between said obtuse surfaces free, said hinge means comprising a ring, said bars being formed with semi-circular channels the radii of which intersect the clamp bars at their meeting edges and at the starting point for said obtuse surfaces and retainer means for holding said ring in said channels, and tube flaring means slidably mounted on said bars and arranged to be moved to the endmost position opposite said obtuse surfaces and having clamp means carried thereby and arranged to clamp said bars at the outer end to face said surfaces together and the other ends of said bars apart.

References Cited in the file of this patent

UNITED STATES PATENTS

| | | |
|---|---|---|
| 2,132,947 | Gagne | Oct. 11, 1938 |
| 2,727,559 | Franck | Dec. 20, 1955 |
| 2,773,539 | Franck | Dec. 11, 1956 |
| 2,861,623 | Franck | Nov. 25, 1958 |
| 2,891,598 | Stanley | June 23, 1959 |
| 2,893,464 | Franck | July 7, 1959 |

UNITED STATES PATENT OFFICE

CERTIFICATE OF CORRECTION

Patent No. 3,050,103                               August 21, 1962

Anton J. Janik

It is hereby certified that error appears in the above numbered patent requiring correction and that the said Letters Patent should read as corrected below.

Column 5, line 24, for "shift" read -- shaft --.

Signed and sealed this 11th day of December 1962.

(SEAL)
Attest:

ERNEST W. SWIDER                              DAVID L. LADD
Attesting Officer                                   Commissioner of Patents